United States Patent
Shibutani et al.

(10) Patent No.: US 9,790,392 B2
(45) Date of Patent: Oct. 17, 2017

(54) COATING COMPOSITION, COATING FILM OBTAINED THEREFROM, MULTILAYER STRUCTURE, AND PROCESS FOR PRODUCING MULTILAYER STRUCTURE

(71) Applicant: THE NIPPON SYNTHETIC CHEMICAL INDUSTRY CO., LTD., Osaka (JP)

(72) Inventors: Mitsuo Shibutani, Osaka (JP); Misa Kuwada, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 0 days.

(21) Appl. No.: 14/893,683

(22) PCT Filed: May 28, 2014

(86) PCT No.: PCT/JP2014/064149
§ 371 (c)(1),
(2) Date: Nov. 24, 2015

(87) PCT Pub. No.: WO2014/192818
PCT Pub. Date: Dec. 4, 2014

(65) Prior Publication Data
US 2016/0115336 A1    Apr. 28, 2016

(30) Foreign Application Priority Data

May 28, 2013   (JP) .................................. 2013-111851
Dec. 6, 2013   (JP) .................................. 2013-253253

(51) Int. Cl.
| | |
|---|---|
| *C09D 129/04* | (2006.01) |
| *C09D 5/02* | (2006.01) |
| *C09D 7/12* | (2006.01) |
| *C09D 133/08* | (2006.01) |
| *C08K 3/22* | (2006.01) |

(52) U.S. Cl.
CPC ............. *C09D 129/04* (2013.01); *C09D 5/02* (2013.01); *C09D 7/12* (2013.01); *C09D 133/08* (2013.01); *C08K 3/22* (2013.01); *C08K 2003/2227* (2013.01)

(58) Field of Classification Search
CPC ...... C09D 129/04; C09D 133/08; C09D 5/02; C09D 7/12; C08K 2003/2227; C08K 3/22
See application file for complete search history.

(56) References Cited

U.S. PATENT DOCUMENTS

| | | | |
|---|---|---|---|
| 2005/0227000 A1* | 10/2005 | Bauer | C09D 5/028 427/180 |
| 2009/0018252 A1 | 1/2009 | Maki et al. | |
| 2010/0261830 A1* | 10/2010 | Shibutani | C08J 5/18 524/503 |

FOREIGN PATENT DOCUMENTS

| | | |
|---|---|---|
| CN | 101133117 A | 2/2008 |
| EP | 1857503 A1 | 11/2007 |
| EP | 2361885 A1 | 8/2011 |
| JP | H03-153770 A | 7/1991 |
| JP | 2010-132519 A | 6/2010 |
| JP | 2010-235680 | 10/2010 |
| JP | 2013-18915 | 1/2013 |

OTHER PUBLICATIONS

International Search Report issued in PCT/JP2014/064149, dated Aug. 12, 2014, along with an English translation thereof.

* cited by examiner

*Primary Examiner* — Robert Jones, Jr.
(74) *Attorney, Agent, or Firm* — Greenblum & Bernstein, P.L.C.

(57) ABSTRACT

The present invention provides a coating film having a high level of heat resistance and a coating composition from which the coating film can be obtained. The coating composition of the invention includes (A) an emulsion which includes a polyvinyl alcohol-based resin as a dispersing agent, an acrylic resin as a dispersoid, and water as a dispersion medium and (B) fibrous metal oxide microparticles, wherein the fibrous metal oxide microparticles have an average major-axis length of 10 to 2,500 nm and an average aspect ratio of 10 to 450.

8 Claims, No Drawings

COATING COMPOSITION, COATING FILM OBTAINED THEREFROM, MULTILAYER STRUCTURE, AND PROCESS FOR PRODUCING MULTILAYER STRUCTURE

TECHNICAL FIELD

The present invention relates to a coating composition containing fibrous metal oxide microparticles, a coating film obtained therefrom, a multilayer structure, and a process for producing the multilayer structure. More particularly, the invention relates to a coating composition from which a coating film and a multilayer structure that have excellent heat resistance can be obtained, and a process for producing the multilayer structure.

BACKGROUND ART

Acrylic resins are excellent in terms of weatherability, transparency, moldability, etc. and hence have conventionally been used extensively as surface-protective coating materials for various interior and exterior materials, displays, outdoor display boards, etc. In recent years, due to the increase in mean air temperature, there is a desire for a coating material which gives surface-protective coating films having such even better heat resistance that the coating films neither contract nor take a color thermally.

A coating composition has been proposed as a heat-resistant coating composition for forming such coating films, the proposed coating composition including inorganic microparticles having a specific particle diameter and an aqueous dispersion (emulsion) of emulsion particles having a specific particle diameter and constituted of a polymer having a specific chemical structure (see patent document 1).

The document includes a statement to the effect that the metal oxide having a specific particle diameter interacts with the aqueous dispersion (emulsion) of emulsion particles having a specific particle diameter and constituted of a polymer having a specific chemical structure and the metal oxide functions as a hardener for the emulsion, thereby improving the transparency and weatherability of a heat-resistant composite to be obtained from the coating composition obtained (see paragraph [0013] of patent document 1). Although this document contains no mention of the aspect ratio of the metal oxide microparticles to be used, the term "metal oxide microparticles" usually means that the microparticles have a spherical shape or a shape similar thereto (metal oxide microparticles having an aspect ratio which is close to 1 or less than 10 at the most). Also from the standpoint of dispersibility, metal oxide microparticles having a spherical or similar shape are usually employed.

The composition includes the metal oxide in an amount of 80 to 350 parts by weight per 100 parts by weight of the solid components of the emulsion.

However, the evaluation of the heat resistance attained with the technique is rated low as the conditions of 150° C. and 10 minutes.

Meanwhile, a heat-resistant coating composition including a synthetic-resin binder is known (see patent document 2). Described is the composition containing a synthetic-resin binder which includes both an acrylic resin emulsion and a PVA-based resin.

According to this technique, the coating composition contains polyvinyl alcohol and a derivative thereof in an amount of 2 to 20% by weight based on the whole synthetic-resin binder. Also described is the coating composition which further contains calcium carbonate or aluminum as a filler. Although this document contains no mention of the aspect ratio of the metal oxide microparticles to be used, metal oxide microparticles having an aspect ratio less than 10 are usually employed from the standpoint of uniform dispersibility of the metal oxide microparticles.

The filler was incorporated in amounts of 18 parts by weight and 21 parts by weight per 100 parts by weight of the solid components of the emulsion contained in the coating composition (see Examples 10 to 13 of patent document 2). In these Examples, the content of the filler in each coating composition relative to the PVA-based resin is 100 parts by weight or 500 parts by weight per 100 parts by weight of the PVA-based resin.

However, the evaluation of the heat resistance attained with this technique is rated low as the conditions of a temperature of 80° C.

Such heat-resistance levels attained with those techniques render the proposed coating compositions difficult to apply to application that require higher level of heat resistance, such as members which, during use, are exposed to direct sunlight and heat up to high temperatures, such as automotive instrument panels, the external walls of buildings, and display panels disposed outdoors, or to members which undergo heat generation or the like, etc. There is hence a desire for a high-quality coating film having an even higher level of heat resistance which renders the coating film suitable for such applications, and for a coating composition from which the coating film can be obtained.

PRIOR-ART DOCUMENTS

Patent Documents

Patent Document 1: JP-A-2010-235680
Patent Document 2: JP-A-2013-18915

SUMMARY OF THE INVENTION

Problem that the Invention is to Solve

An object of the invention is to overcome the problem and provide a coating film having a high level of heat resistance and a coating composition from which the coating film can be obtained.

Means for Solving the Problem

The present inventors diligently made investigations in view of such circumstances and, as a result, have discovered that a coating film and a multilayer structure which have a high level of heat resistance are obtained by using a coating composition obtained by incorporating fibrous metal oxide microparticles having a specific aspect ratio and a specific major-axis length into an emulsion which includes a polyvinyl alcohol-based resin (hereinafter often referred to as PVA-based resin) as a dispersing agent and an acrylic resin as a dispersoid. The present invention has been thus achieved.

Essential points of the present invention are as shown below under [1] to [8].

[1] A coating composition comprising (A) an emulsion which comprises a polyvinyl alcohol-based resin as a dispersing agent, an acrylic resin as a dispersoid, and water as a dispersion medium and (B) fibrous metal oxide microparticles, wherein the fibrous metal oxide microparticles have an average major-axis length of 10 to 2,500 nm and an average aspect ratio of 10 to 450.

[2] The coating composition according to [1], wherein the amount of the fibrous metal oxide microparticles (B) incorporated into the coating composition is 0.1 to 10 parts by weight per 100 parts by weight of the resinous solid components of the coating composition.

[3] The coating composition according to [1] or [2], wherein the fibrous metal oxide microparticles (B) are fibrous microparticles of an oxide of a metal selected from the Group 13 to 15 elements of the periodic table.

[4] The coating composition according to any one of [1] to [3], wherein the polyvinyl alcohol-based resin of the emulsion (A) is a polyvinyl alcohol-based resin which has a structural unit represented by the following chemical formula (1).

[Chem. 1]

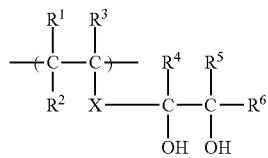

(1)

(In formula (1), $R^1$, $R^2$, and $R^3$ each independently represent a hydrogen atom or an organic group, X represents a single bond or a bonding chain, and $R^4$, $R^5$, and $R^6$ each independently represent a hydrogen atom or an organic group.)

[5] The coating composition according to any one of [1] to [4], which includes a second polyvinyl alcohol-based resin.

[6] A coating film obtained from the coating composition according to any one of [1] to [5].

[7] A multilayer structure comprising a coating film layer constituted of the coating film according to [6] on a base.

[8] A process for producing a multilayer structure, the process comprising applying the coating composition according to any one of [1] to [5] to a base and forming a film to obtain the multilayer structure.

Effects of the Invention

In the invention, an excellent effect is produced in which by using fibrous metal oxide microparticles having a specific aspect ratio and a specific major-axis length in combination with the emulsion, a coating film having a high level of heat resistance is obtained. Specifically, the coating film has such a high level of heat resistance that even when severely heated at 150° C. for 3 hours, the coating film is inhibited from contracting and is less apt to take a color.

MODES FOR CARRYING OUT THE INVENTION

The configuration of the invention is explained below in detail, but the following explanations merely show desirable embodiments.

In this description, in the case where "acrylic" and "methacrylic" are not especially distinguished from each other, these are inclusively referred to as "(meth)acrylic". In the case where "acrylate" and "methacrylate" are not especially distinguished from each other, these are inclusively referred to as "(meth)acrylate".

In the invention, the term "solid components" and "resinous solid components" each mean the matter obtained by subjecting the object being examined to a drying loss method at 105° C. for 3 hours.

The coating composition of the invention includes (A) an emulsion which includes a polyvinyl alcohol-based resin as a dispersing agent, an acrylic resin as a dispersoid, and water as a dispersion medium and (B) fibrous metal oxide microparticles, wherein the fibrous metal oxide microparticles have an average major-axis length of 10 to 2,500 nm and an average aspect ratio of 10 to 450.

<Explanation of Emulsion (A)>

The coating composition of the invention includes an emulsion including a polyvinyl alcohol-based resin as a dispersing agent, an acrylic resin as a dispersoid, and water as a dispersion medium and gives coating films which exhibit a high level of heat resistance, in the case where fibrous metal oxide microparticles having a specific aspect ratio and a specific major-axis length are incorporated thereinto in a specific small amount.

<Explanation of the PVA-Based Resin as Dispersing Agent>

The emulsion (A) included in the coating composition of the invention includes a PVA-based resin as a dispersing agent. As the PVA-based resin to be used in the invention, known PVA-based resins can be employed.

The degree of saponification (determined in accordance with JIS K6726 (1994-year issue)) of the PVA-based resin serving as a dispersing agent is usually 85 to 100% by mole, preferably 90 to 100% by mole, especially preferably 95 to 100% by mole. In case where the degree of saponification thereof is too low, an acetic-acid-eliminating reaction or the like is prone to occur to form conjugated structures in the main chain of the polyvinyl alcohol molecule and coating films which are prone to take a color tend to be obtained.

The average degree of polymerization (determined in accordance with JIS K6726 (1994-year issue)) of the PVA-based resin is usually 50 to 2,500, preferably 100 to 1,700, more preferably 100 to 1,200, especially preferably 200 to 500. In case where the average degree of polymerization thereof is too low, coating films having reduced strength tend to be obtained. Conversely, in case where the average degree of polymerization thereof is too high, there are tendencies that it is difficult to control the domain size of the dispersoid and that the emulsion has reduced shelf stability.

In the invention, a known modified PVA-based resin may be used as the PVA-based resin serving as a dispersing agent. In the case of using a modified PVA-based resin, too large modification amounts (content of modified vinyl alcohol structural units) tend to result in an increased viscosity of the emulsion. Because of this, a modified PVA-based resin having a modification amount of 15% by mole or less, preferably 10% by mole or less, is usually employed.

Examples of modifying monomers for the PVA-based resin include olefins such as ethylene, propylene, isobutylene, α-octene, α-dodecene, and α-octadecene, hydroxy-containing α-olefins such as 3-buten-1-ol, 4-penten-1-ol, and 5-hexen-1-ol and derivatives thereof such as acylation products, unsaturated acids such as acrylic acid, methacrylic acid, crotonic acid, maleic acid, maleic anhydride, itaconic acid, and undecylenic acid and salts, monoesters, or dialkyl esters thereof, amides such as diacetoneacrylamide, acrylamide, and methacrylamide, olefinsulfonic acids such as ethylenesulfonic acid, allylsulfonic acid, and methallylsulfonic acid or salts thereof, and vinylsilanes such as vinyltrimethoxysilane and vinyltriethoxysilane.

The modification method in which any of these modifying monomers is used for a PVA-based resin is copolymerization, and known post-modifications such as, for example, graft modification, can also be used.

As the modified PVA-based resin, it is preferred to use a PVA-based resin modified with either a hydroxy-containing α-olefin or a derivative thereof, e.g., an acylation product. It is more preferred to use a PVA-based resin having a structural unit represented by the following general formula (1) (hereinafter sometimes referred to as "PVA-based resin containing a side-chain 1,2-diol structural unit").

[Chem. 2]

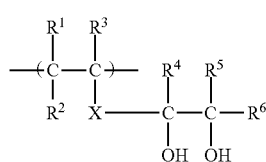

(1)

(In formula (1), $R^1$, $R^2$, and $R^3$ each independently represent a hydrogen atom or an organic group, X represents a single bond or a bonding chain, and $R^4$, $R^5$, and $R^6$ each independently represent a hydrogen atom or an organic group.)

In cases when the PVA-based resin used as the dispersing agent of the emulsion has such structural unit, the emulsion is apt to interact with the fibrous metal oxide microparticles. The coating composition containing this emulsion gives a coating film in which the modified PVA-based resin constitutes a continuous phase and the amorphous parts of this PVA-based resin can be made to have reduced crystallinity while reducing the free volume thereof. Consequently, the coating film obtained can be inhibited, even when exposed to high-temperature conditions, from suffering the contraction or the like which accompanies the crystallization of the PVA-based resin constituting the continuous phase. Thus, a high level of heat resistance is obtained.

In general formula (1), $R^1$ to $R^6$ each independently represent a hydrogen atom or an organic group. It is desirable that $R^1$ to $R^6$ is all hydrogen atoms. However, $R^1$ to $R^6$ may be organic groups so long as the resin properties are not considerably impaired thereby. Although the organic groups are not particularly limited, alkyl groups having 1 to 4 carbon atoms, such as, for example, methyl, ethyl, n-propyl, isopropyl, n-butyl, isobutyl, and tert-butyl, are preferred. Such alkyl groups may have substituents such as a halogeno, hydroxy group, ester group, carboxy group, sulfo group, etc., according to need.

In general formula (1), X is a single bond or a bonding chain, and preferably is a single bond from the standpoints of improving crystallinity and reducing the free volume (intermolecular interstices) of the amorphous parts. The bonding chain is not particularly limited, and examples thereof include hydrocarbons such as alkylenes, alkenylenes, alkynylenes, phenylene, and naphthylene (these hydrocarbons may have been substituted with, for example, halogens such as fluorine, chlorine, and bromine atoms), and further include —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—. The R moieties each independently are any substituent, and preferably are a hydrogen atom or an alkyl group, and m is a natural number. It is preferable that the bonding chain is an alkylene having up to 6 carbon atoms, in particular methylene or —CH$_2$OCH$_2$—, among those examples, from the standpoints of viscosity stability during production, heat resistance, etc.

The most preferred structure of the 1,2-diol structural unit represented by general formula (1) is that in which $R^1$ to $R^6$ are all hydrogen atoms and X is a single bond. Namely, the structural unit represented by the following structural formula (1a) is most preferred.

[Chem. 3]

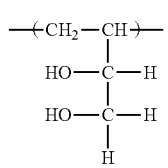

(1a)

Such a PVA-based resin containing a side-chain 1,2-diol structural unit can be produced by known production processes. For example, the PVA-based resin can be produced by the processes described in JP-A-2002-284818, JP-A-2004-285143, JP-A-2006-95825, etc.

In the case where the PVA-based resin serving as a dispersing agent is a PVA-based resin containing a side-chain 1,2-diol structural unit, this PVA-based resin may have a modification amount in a range different from the range shown above. The content of the side-chain 1,2-diol structural unit is usually 0.5 to 15% by mole, preferably 1 to 10% by mole, more preferably 3 to 9% by mole. In the case where the PVA-based resin contains the side-chain 1,2-diol structural unit in an amount within that range, a high level of heat resistance tends to be obtained more effectively. In addition, the degree of grafting of the PVA-based resin onto the acrylic resin as a dispersoid becomes higher and this tends to result in improvements in the mechanical stability, shelf stability, etc. of the emulsion.

The content ratio of the side-chain 1,2-diol structural unit in the PVA-based resin can be determined from a $^1$H-NMR spectrum (solvent, DMSO-d6; internal reference, tetramethylsilane) of the PVA-based resin having a degree of saponification of 100%. Specifically, the content thereof may be calculated from the areas of the peaks assigned to the hydroxy protons, methine proton(s), and methylene proton(s) of the 1,2-diol structural unit and to the methylene protons of the main chain, the protons of the hydroxy groups bonded to the main chain, etc.

<Explanation of the Acrylic Resin as Dispersoid>

The emulsion (A) included in the coating composition of the invention includes an acrylic resin as a dispersoid. As the acrylic resin to be used in the invention, known acrylic resins for use in acrylic emulsions can be employed.

The acrylic resin is a polymer of one or more acrylic monomers. Examples of the acrylic monomers include: (meth)acrylic ester monomers such as methyl (meth)acrylate, ethyl (meth)acrylate, n-propyl (meth)acrylate, isopropyl (meth)acrylate, butyl (meth)acrylate, isobutyl (meth)acrylate, tert-butyl (meth)acrylate, n-pentyl (meth)acrylate, isopentyl (meth)acrylate, hexyl (meth)acrylate, 2-hexyl (meth)acrylate, octyl (meth)acrylate, isononyl (meth)acrylate, and decyl (meth)acrylate; and hydroxyl-containing (meth)acrylates such as 2-hydroxyethyl (meth)acrylate, 2-hydroxypropyl (meth)acrylate, 3-hydroxypropyl (meth)

acrylate, 4-hydroxybutyl (meth)acrylate, 5-hydroxypentyl (meth)acrylate, and 6-hydroxyhexyl (meth)acrylate. Although these monomers each can be subjected alone to polymerization, it is preferred to use a mixture of two or more thereof.

One or more monomers other than acrylic monomers can be copolymerized to the acrylic resin so long as the effects of the invention are not lessened thereby. In the case of copolymerizing one or more monomers other than acrylic monomers, the content thereof, based on the acrylic monomer(s), is usually less than 20% by weight, preferably less than 10% by weight. Examples of the monomers other than acrylic monomers include vinyl ester monomers, diene monomers, olefin monomers, acrylamide monomers, acrylonitrile monomers, styrene monomers, vinyl ether monomers, and allyl monomers.

Preferred acrylic monomers for constituting the acrylic resin include (meth)acrylic ester monomers. More preferred are (meth)acrylic ester monomers having 5 to 15 carbon atoms. Especially preferred are (meth)acrylic ester monomers having 5 to 10 carbon atoms.

[Emulsion Polymerization: Synthesis of the Emulsion]

This emulsion is configured of an aqueous dispersion medium and, dispersed therein, particles which include both the PVA-based resin serving as a dispersing agent and the acrylic resin serving as a dispersoid. This emulsion is obtained by emulsion-polymerizing one or more of the acrylic monomers (and, if desired, one or more monomers other than acrylic monomers) in the presence of the dispersing agent.

Examples of methods for conducting the emulsion polymerization include: i) a method in which acrylic monomers (and, if desired, one or more other monomers) as a starting material for the dispersoid are introduced at a time or continuously in the presence of water, a PVA-based resin as a dispersing agent, and a polymerization catalyst, and the resultant mixture is heated and stirred to thereby emulsion-polymerize the monomers; and ii) a method in which acrylic monomers (and optional monomers, which are monomers other than acrylic monomers) are mixed with and dispersed in an aqueous solution of a PVA-based resin to prepare a dispersion, the dispersion prepared is introduced at a time or continuously into a system into which water, a PVA-based resin, and a polymerization catalyst have been introduced, and the resultant mixture is heated and stirred to emulsion-polymerize the monomers. This method in which a dispersion prepared beforehand is used is especially called a pre-emulsion method. This method is preferred because even when the makeup of the monomers to be polymerized is complicated, the emulsion polymerization can be carried out without lowering the production efficiency.

Usually, the dispersion medium in the reaction solution to be used in the emulsion polymerization is water. According to need, a water-miscible organic solvent (e.g., a lower alcohol usually having 1 to 3 carbon atoms) can be used in combination with the water. Preferably, however, water alone is used from the standpoint of the dispersibility of the monomers to be emulsion-polymerized.

The addition amount of the PVA-based resin to be used as a dispersing agent during the emulsion polymerization varies to some degree depending on the kind of the PVA-based resin used, the concentration of the emulsion to be synthesized, etc. However, the addition amount thereof, based on the solid components of the emulsion, is usually 0.1 to 30% by weight, desirably 1 to 25% by weight, especially 1 to 20% by weight. In case where the addition amount of the PVA-based resin is too small, the acrylic monomers (and optional monomers, which are monomers other than acrylic monomers) have an unstable emulsified state and this tends to result in a decrease in polymerizability and a decrease in the stability of the emulsified state of the particles in the emulsion to be obtained by the polymerization. Meanwhile, in case where the additional amount of the PVA-based resin is too large, there is a tendency that the liquid reaction mixture has too high a viscosity, resulting in a decrease in the rate of polymerization reaction, or that an emulsion having too high a viscosity is obtained.

As the polymerization catalyst, use can be made of a polymerization catalyst for use in the field of emulsion polymerization. Examples thereof include water-soluble redox polymerization catalysts such as potassium persulfate, ammonium persulfate, potassium bromate, acid sodium sulfite, hydrogen peroxide/tartaric acid, hydrogen peroxide/iron salt, hydrogen peroxide/ascorbic acid/iron salt, hydrogen peroxide/Rongalit, and hydrogen peroxide/Rongalit/iron salt. These catalysts can be used either alone or as a mixture of two or more thereof. Specifically, use can be made of a catalyst configured of an organic peroxide and a redox system, such as "Kayabutyl B", manufactured by Kayaku Akuzo Corp., or "Kayabutyl A-50C", manufactured by the same company.

The amount of the polymerization initiator to be used is usually 0.01 to 10 parts by weight, preferably 0.05 to 5 parts by weight, more preferably 0.1 to 3 parts by weight, per 100 parts by weight of the monomers to be subjected to the polymerization. In case where the use amount of the polymerization initiator is too small, the rate of polymerization tends to be too low. Conversely, in case where the amount thereof is too large, polymerization stability tends to decrease.

Methods for introducing the polymerization initiator are not particularly limited. The polymerization initiator may be introduced en bloc into the liquid reaction mixture in an initial stage, or may be continuously added with the progress of the polymerization.

The emulsion polymerization may be conducted in one stage, or may be conducted in multiple portions, i.e., in two or more stages. In particular, in the case of performing the emulsion polymerization in two stages, use can be made of a method in which different monomer feed amounts (feed ratios) are used in the first stage and second stage, thereby making the inner layer formed in the first stage and the outer layer formed in the second stage differ from each other in glass transition point (Tg). Examples thereof include the following two-stage polymerization.

(1) First-Stage Polymerization Step

Some of the monomers to be polymerized are introduced into a reaction vessel which contains a dispersion medium and a dispersing agent, and first-stage emulsion polymerization is conducted. Although the amount of the monomers to be introduced in the first stage is not particularly limited, the amount thereof is usually about 1 to 50% by weight, preferably 5 to 30% by weight, of the monomers to be used in the polymerization. Conditions for the first-stage emulsion polymerization step may be suitably determined in accordance with the kinds of the monomers to be used, makeup thereof, amount of the polymerization initiator used, etc.

The temperature for the emulsion polymerization reaction is usually 30 to 90° C., especially preferably 40 to 80° C. The polymerization period is usually 1 to 4 hours. In the first-stage emulsion polymerization step, the conversion into polymer is usually 50% or higher, more preferably 60% or higher.

(2) Second-Stage Polymerization Step

The second-stage emulsion polymerization is conducted by introducing the remaining monomers into the reaction vessel in which the first-stage polymerization has ended. Although the remaining monomers may usually be introduced in an ordinary way, it is preferred to dropwise introduce the monomers. For the second-stage polymerization, a polymerization catalyst may be introduced. The second-stage polymerization may be conducted under the conditions of a polymerization temperature of usually 40 to 80° C. and a polymerization period of usually 1 to 6 hours.

It is also possible to use a power feed polymerization method in which the monomers are dropped while continuously changing the proportion of the monomers being dropped. Also usable is a method in which a dispersion obtained beforehand by mixing and dispersing the monomers in the presence of a PVA-based resin serving as a dispersing agent is dropped and polymerized simultaneously.

According to need, additional polymerization may be conducted usually for 1 to 6 hours after this step. A polymerization catalyst may be introduced during this polymerization.

In the emulsion polymerization described above, the system may contain a molecular weight regulator according to need. Examples of the molecular weight regulator include: alkyl mercaptans such as n-hexyl mercaptan, n-octyl mercaptan, t-octyl mercaptan, n-dodecyl mercaptan, t-dodecyl mercaptan, and n-stearyl mercaptan; xanthogen compounds such as dimethylxanthogen disulfide and diisopropylxanthogen disulfide; thiuram compounds such as terpinolene, tetramethylthiuram disulfide, tetraethylthiuram disulfide, and tetramethylthiuram monosulfide; phenol compounds such as 2,6-di-t-butyl-4-methylphenol and styrenated phenol; allylic compounds such as allyl alcohol; halogenated hydrocarbon compounds such as dichloromethane, dibromomethane, and carbon tetrabromide; vinyl ethers such as α-benzyloxystyrene, α-benzyloxyacrylonitrile, and α-benzyloxyacrylamide; and triphenylethane, pentaphenylethane, acrolein, methacrolein, acetaldehyde, thioglycolic acid, thiomalic acid, 2-ethylhexyl thioglycolate, and α-methylstyrene dimer. In the emulsion polymerization step, one of these molecular weight regulators can be used alone or two or more thereof can be used in combination.

Besides the dispersing agent, a surfactant such as, for example, a nonionic surfactant or an anionic surfactant may be caused to be present in the system so long as the surfactant does not lessen the dispersion-stabilizing effect of the PVA-based resin. The amount of the surfactant to be introduced is usually 10% by weight or less, preferably 5% by weight or less, based on the whole emulsion polymerization system.

Examples of the nonionic surfactant include the polyoxyethylene alkyl ether type, polyoxyethylene alkylphenol type, polyoxyethylene polyhydric alcohol ester type, esters of a polyhydric alcohol with a fatty acid, and oxyethylene/oxypropylene block polymers.

Examples of the anionic surfactant include higher alcohol sulfuric acid salts, higher fatty acid alkali salts, polyoxyethylene alkylphenol ether sulfuric acid salts, alkylbenzenesulfonic acid salts, naphthalenesulfonic acid salt/formalin condensates, (alkyldiphenyl ether)sulfonic acid salts, dialkylsulfosuccinic acid salts, and higher alcohol phosphoric ester salts.

Furthermore, a plasticizer such as, for example, a phthalic acid ester or a phosphoric acid ester, a pH regulator such as, for example, sodium carbonate, sodium acetate, or sodium phosphate, etc. can also be used.

<With respect to Emulsion (A)>

By conducting emulsion polymerization in the manner described above, an emulsion is obtained in which particles including both the acrylic resin synthesized (dispersoid) and the PVA-based resin serving as a dispersing agent are dispersed in an aqueous dispersion medium.

The average particle diameter of the particles is usually 100 to 700 nm, preferably 200 to 500 nm. The values of the average particle diameter of the particles are ones measured with a zeta-potential meter.

The content of resinous solid components in the emulsion (A) obtained is usually 10 to 60% by weight, preferably 20 to 58% by weight, more preferably 30 to 55% by weight, especially preferably 35 to 53% by weight. The term "resinous solid components of the emulsion (A)" means the total amount of the resins contained in the emulsion (A), and the values thereof are ones measured by the drying loss method. The resinous solid components include the acrylic resin synthesized (dispersoid) and the PVA-based resin as a dispersing agent.

The viscosity of the emulsion obtained is usually 100 to 20,000 mPa·s, more preferably 300 to 10,000 mPa·s, especially preferably 450 to 8,000 mPa·s. The values of the viscosity of the emulsion are ones measured with a Brookfield viscometer.

<Explanation of Fibrous Metal Oxide Microparticles (B)>

The aspect ratio of the fibrous metal oxide microparticles (B) to be used in the coating composition in the invention is 10 to 450, preferably 100 to 400, especially preferably 200 to 400, in terms of an average value determined from particle diameters measured on an electron photomicrograph. In case where the aspect ratio thereof is too high, reduced heat resistance tends to be obtained and the coating film obtained tends to have anisotropy. In case where the aspect ratio thereof is too low, reduced heat resistance tends to be obtained.

Usable as the fibrous metal oxide microparticles (B) in the coating composition in the invention are, for example, the oxides of alkaline earth metals, such as magnesium oxide and calcium oxide, the oxides of metals belonging to Group 4 of the long-form periodic table (hereinafter the term "periodic table" means the long-form periodic table unless otherwise indicated), such as titanium oxide and zirconium oxide, the oxides of metals which are elements belonging to Group 13 of the periodic table, such as aluminum oxide (hereinafter often referred to as alumina) and indium oxide, the oxides of metals which are elements belonging to Group 14 of the periodic table, such as silicon dioxide, tin oxide, and lead oxide, and the oxides of metals which are elements belonging to Group 15 of the periodic table, such as antimony oxide. One of these chemical species of metal oxides may be used alone, or two or more thereof may be used in combination.

Preferred of these from the standpoint of effectively obtaining a high level of heat resistance are fibrous microparticles of metal oxides in which the metals are Group 13 to 15 elements of the periodic table. More preferred are fibrous microparticles of metal oxides in which the metals are Group 13 elements of the periodic table. Especially preferred are fibrous aluminum oxide microparticles.

The average major-axis length of the fibrous metal oxide microparticles is 10 to 2,500 nm, preferably 500 to 2,000 nm, especially preferably 1,000 to 1,800 nm, in terms of an average value determined from particle diameters measured on an electron photomicrograph. The average minor-axis length thereof, in terms of an average value determined by a similar method, is usually 0.5 to 10 nm, preferably 1 to 8 nm, especially preferably 1 to 5 nm. In case where the values thereof is too large, the fibrous microparticles are difficult to disperse and tend to give agglomerates. In case where the values thereof are too small, air bubbles tend to be included during stirring.

The fibrous metal oxide microparticles (B) to be used can be in any state selected from among a solid powder, an aqueous dispersion or sol thereof, an aqueous solution, e.g., colloidal silica, and the like. From the standpoint of affinity for the emulsion (A), a sol is preferred, and a sol including water as the medium is especially preferred.

In the case where the fibrous metal oxide microparticles (B) are fibrous aluminum oxide microparticles, it is especially preferable that these microparticles are a sol of fibrous alumina microparticles which was produced by the method described in JP-A-2010-132519. This sol of fibrous alumina microparticles is a sol of fibrous or acicular alumina particles synthesized by the sol-gel method using an aluminum alkoxide as a starting material, and is crystals of an alumina hydrate represented by the empirical formula $Al_2O_3 \cdot nH_2O$ (n is 1 to 1.5). This crystal system is boehmite or pseudo-boehmite. For example, F-1000 (alumina sol: major-axis length, 1,400 nm; minor-axis length, 4 nm; aspect ratio, 350), available from Kawaken Fine Chemicals Co., Ltd., and the like are suitable for use.

In the process for producing a sol of fibrous alumina microparticles, an aluminum alkoxide is hydrolyzed in an aqueous acid solution to obtain an alumina hydrate, and the alcohol yielded is distilled off. Thereafter, the residue is peptized. Thus, an alumina sol in which fibrous or acicular alumina hydrate particles are dispersed in an aqueous medium can be produced.

Examples of the aluminum alkoxide include aluminum alkoxides such as aluminum ethoxide, aluminum isopropoxide, aluminum n-butoxide, and aluminum sec-butoxide, cyclic aluminum oligomers, and aluminum chelates such as diisopropoxy(ethylacetoacetato)aluminum and tris(ethylacetoacetato)aluminum.

Especially preferred of these compounds are ones having an alkoxyl group having 2 to 5 carbon atoms, since these aluminum alkoxides have moderate hydrolyzability and removal of the by-products is easy. With respect to the state of these alkoxides, each alkoxide may be liquid or in a powdery or granular state. It is preferable that the purity thereof is 99% or higher.

It is preferable that the acid to be used for the hydrolysis is a monobasic acid such as hydrochloric acid, nitric acid, formic acid, acetic acid, propionic acid, or butyric acid. Since inorganic acids tend to remain in the alumina even after burning, organic acids are preferred. An especially preferred organic acid is acetic acid from the standpoints of operating efficiency and profitability and of improving the color tone at 150° C. of the composition of the invention, etc.

In the invention, the fibrous metal oxide microparticles (B) are not included in the resinous solid components of the coating composition of the invention.
<Explanation of Other Ingredients>

Additive ingredients for common use in coating materials for forming coating films or in molding resins can be incorporated into the coating composition of the invention. Examples thereof include light stabilizers, ultraviolet absorbers, thickeners, leveling agents, thixotropic agents, defoamers, freezing stabilizers, matting agents, crosslinking reaction catalysts, pigments, hardening catalysts, crosslinking agents, anti-skinning agents, dispersing agents, wetting agents, antioxidants, ultraviolet absorbers, rheological behavior controlling agents, film formation aids, rust preventives, dyes, plasticizers, lubricants, reducing agents, antiseptics, fungicides, deodorizers, yellowing inhibitors, and electrostatic inhibitors or charge control agents. Such additive ingredients can be selected and incorporated suitably in combination, in accordance with the respective purposes. In the case where the coating composition contains such additive ingredients, the organic components of the additive ingredients are included in the resinous solid components of the coating composition.

The amount of the additive ingredients which can be incorporated is usually less than 10 parts by weight, preferably less than 5 parts by weight, per 100 parts by weight of the resinous solid components of the emulsion (A) in the coating composition.

In particular, in the coating composition of the invention, there is a tendency that in cases when a PVA-based resin dissolved in the dispersion medium is contained therein in an amount within a specific range, the coating film formed therefrom has further improved heat resistance probably because the interstices between the emulsion particles are moderately enlarged. For regulating the amount of the PVA-based resin contained in a dissolved state in the dispersion medium to a value within a specific range in the coating composition of the invention, use may be made, for example, of (i) a method in which the PVA-based resin serving as a dispersing agent in the emulsion (A) (this PVA-based resin being sometimes referred to as "first PVA-based resin" for convenience) is used in an amount larger than the usual amount; (ii) a method in which a PVA-based resin (sometimes referred to as "second PVA-based resin" for convenience) is incorporated as another ingredient besides the emulsion (A) and the fibrous metal oxide microparticles (B); or (iii) a method in which methods (i) and (ii) are used in combination. In the case of (ii), the PVA-based resin may be either solid or a solution prepared by dissolving the PVA-based resin in a solvent having an affinity for the dispersion medium of the coating composition. However, the solution is preferred.

In either method, the content of the PVA-based resin is included in the resinous solid components of the coating composition of the invention.

In method (i), the amount of the PVA-based resin for use as a dispersing agent during the emulsion polymerization for producing the emulsion (A) described above is added usually larger than 30% by weight but not larger than 60% by weight, preferably 31 to 60% by weight, especially preferably 35 to 50% by weight, based on the solid components of the emulsion (A).

Method (ii) is explained below.

As the PVA-based resin (second PVA-based resin) for use in method (ii), a known PVA-based resin can be employed as in the case of the PVA-based resin serving as a dispersing agent.

The degree of saponification (determined in accordance with JIS K6726 (1994-year issue)) of the second PVA-based resin is usually 80 to 100% by mole, preferably 85 to 100% by mole. In case where the degree of saponification thereof is too low, an acetic-acid-eliminating reaction or the like is prone to occur to form conjugated structures in the main chain of the polyvinyl alcohol molecule and coating films which are prone to take a color tend to be obtained.

The average degree of polymerization (determined in accordance with JIS K6726 (1994-year issue)) of the second PVA-based resin is usually 50 to 2,500, preferably 100 to 2,500, more preferably 300 to 2,400, especially preferably 300 to 1,200. The degree of polymerization and concentration of the second PVA-based resin to be added can be set at will in accordance with the desired viscosity of the coating composition. In case where the average degree of polymerization thereof is too low, it tends to be difficult to regulate the viscosity or resin content of the coating composition. In case where the average degree of polymerization thereof is too high, the regulation of resin content also tends to be difficult and there is a tendency that the degree of freedom of thickness control becomes low.

As the second PVA-based resin also, use can be made of a modified PVA-based resin as in the case of the PVA-based resin serving as a dispersing agent. It is, however, preferable that the second PVA-based resin is an unmodified polyvinyl alcohol resin having no modifying groups.

In method (ii), a PVA-based resin of a kind different from that of the first PVA-based resin can be used as the second PVA-based resin.

In the case where a PVA-based resin of a different kind is used, the first PVA-based resin, which serves as a dispersing agent of the emulsion for use in the invention, and the second PVA-based resin either are completely compatible with each other (sea-sea structure) to form a homogeneous phase or form a sea-island structure. From the standpoint of the strength of the continuous phase in the coating film to be obtained from the coating composition of the invention, it is preferable that in the case where a sea-island structure is formed, the domain size is regulated so as to be small (usually, a domain diameter of 1.5 μm or less).

From that standpoint, the difference in the degree of saponification in the case of using a PVA-based resin of a different kind is usually 0 to 15% by mole, preferably 3 to 10% by mole.

Furthermore, especially in method (ii), it is preferable that the degree of saponification of the first PVA-based resin, which serves as a dispersing agent of the emulsion for use in the invention, is higher than the degree of saponification of the second PVA-based resin. It is thought that in this case, the first PVA-based resin can form a stable matrix in the continuous phase of the coating film to be obtained from the coating composition and, hence, the continuous phase satisfactorily retains strength.

The amount in which the second PVA-based resin is to be incorporated may differ from that of additive ingredients shown above, and may be usually 0.1 to 30% by weight, preferably 1 to 20% by weight, especially preferably 3 to 10% by weight, based on the coating composition.

Meanwhile, the amount thereof, per 100 parts by weight of the resinous solid components of the emulsion (A) in the coating composition, is usually 5 to 1,000 parts by weight, preferably 10 to 100 parts by weight, especially preferably 10 to 30 parts by weight.

The second PVA-based resin may be incorporated after ingredient (A) has been mixed with ingredient (B), or may be incorporated beforehand into ingredient (A) and/or ingredient (B).

It is especially preferable that the second PVA-based resin is incorporated beforehand into the emulsion as ingredient (A) to prepare an emulsion composition, from the standpoint of the dispersion stability of the dispersoid of the emulsion (A).

<Explanation of the Coating Composition>

The coating composition of the invention is a coating composition including (A) an emulsion which includes a polyvinyl alcohol-based resin as a dispersing agent, an acrylic resin as a dispersoid, and water as a dispersion medium and (B) fibrous metal oxide microparticles, wherein the fibrous metal oxide microparticles have an average major-axis length of 10 to 2,500 nm and an average aspect ratio of 10 to 450.

By using the coating composition, in which fibrous metal oxide microparticles having a specific major-axis length and a specific aspect ratio are contained in combination with the emulsion including both a PVA-based resin as a dispersing agent and an acrylic resin as a dispersoid, coating films having a high level of heat resistance are obtained.

The content of resinous solid components in the emulsion (A) to be used for producing the coating composition is usually 5 to 60% by weight, preferably 10 to 55% by weight, especially preferably 20 to 50% by weight. In cases when the content of resinous solid components is within that range, subsequent mixing with the fibrous metal oxide microparticles (B) tends to give an even coating composition.

In the coating composition, the amount of the fibrous metal oxide microparticles (B) incorporated thereinto is usually 0.1 to 10 parts by weight, preferably 0.5 to 8 parts by weight, especially preferably 0.7 to 4 parts by weight, pre 100 parts by weight of the resinous solid components contained in the coating composition.

In cases when the incorporation amount thereof is within that range, coating films having a high level of heat resistance tend to be easily obtained.

Furthermore, in the invention, by employing the fibrous metal oxide microparticles, which have a specific aspect ratio and a specific major-axis length, in the coating composition, coating films having a higher level of heat resistance than conventional ones can be obtained even when the fibrous metal oxide microparticles have been incorporated in an amount far smaller than the incorporation amounts of conventional metal oxide microparticles.

In cases when heat resistance is desired to be further improved on the basis of prior-art techniques, a person usually conceives of heightening the incorporation amount of the metal oxide microparticles. In the invention, however, even when the incorporation amount of the metal oxide microparticles in the coating composition is small, the coating film obtained therefrom shows a high level of heat resistance. Specifically, the coating film, even when exposed to severe 3-hour heating at 150° C., is inhibited from contracting and is less apt to take a color. These results conflict with the conventional knowledge, and are considered to be an unexpected remarkable effect.

The content of resinous solid components in the coating composition is usually 10 to 60% by weight, more preferably 20 to 58% by weight, even more preferably 25 to 55% by weight, especially preferably 30 to 50% by weight.

In case where the content thereof is too high, the coating composition tends to have too high a viscosity and tends to be reduced in coating property, leveling property, etc. In case where the content thereof is too low, the coating composition tends to have reduced storage stability.

The content of the PVA-based resin(s) on a solid basis in the coating composition varies depending on the makeup of the emulsion used and the content of resinous solid components therein or on the proportion of the emulsion to the fibrous metal oxide microparticles (B), but is usually 1 to 30% by weight, preferably 2 to 20% by weight, more preferably 3 to 18% by weight.

The amount of the fibrous metal oxide microparticles (B) incorporated into the coating composition is usually 0.1 to 50 parts by weight, preferably 1 to 40 parts by weight, more preferably 1 to 30 parts by weight, especially preferably 1 to 20 parts by weight, per 100 parts by weight of the solid components of the PVA-based resin(s) in the coating composition.

In case where the incorporation amount thereof is too large, the coating composition tends to be reduced in film-forming property and transparency. In case where the incorporation amount thereof is too small, the coating composition tends to have reduced heat resistance.

The total content of solid components (i.e., the content of all solid components including organic matters, e.g., the resins, and inorganic matters, e.g., the fibrous metal oxide microparticles (B)) in the coating composition is usually 10.1 to 70% by weight, preferably 20 to 60% by weight, especially preferably 25 to 50% by weight.

When the coating composition is produced, a dispersion into which the emulsion (or emulsion composition) has been incorporated optionally together with additive ingredients is stirred at usually 1,000 to 3,000 rpm, preferably 1,500 to 2,500 rpm, for usually 0.1 to 60 minutes, preferably 0.1 to 30 minutes, especially preferably 0.1 to 15 minutes.

This stirring step can be conducted in multiple stages.

The viscosity of the coating composition obtained is usually 100 to 20,000 mPa·s, more preferably 300 to 10,000 mPa·s, especially preferably 450 to 8,000 mPa·s. The values of the viscosity of the coating composition are ones measured with a Brookfield viscometer. Water or an alcohol or ketone which has 1 to 4 carbon atoms and is water-miscible can be incorporated in order to regulate the viscosity.

<Methods for Producing the Coating Film>

The coating film of the invention is a coating film which was obtained from the coating composition including both the emulsion (A) and the specific fibrous metal oxide microparticles (B) and which has a dispersoid and a continuous phase. This coating film includes, as the main component, a water-insoluble dispersoid derived from the acrylic resin serving as the dispersoid of the emulsion (A) and has a slight amount of a water-soluble continuous phase derived from the PVA-based resin serving as the dispersing agent of the emulsion (A).

By applying the coating composition of the invention to a base and heat-treating the coating composition applied, a coating film can be obtained.

The base is not particularly limited, and examples of the material thereof include synthetic resins such as thermoplastic resins and thermosetting resins, glasses, metallic materials such as aluminum foils, and natural materials such as paper and wood. Examples of the shape thereof include films, sheets, nonwoven fabric, and various molded articles.

Examples of the thermoplastic resins include: polyolefin-based resins such as low-density polyethylene, ultralow-density polyethylene, high-density polyethylene, polypropylene, ethylene/propylene copolymers, ethylene/butene copolymers, ethylene/vinyl acetate copolymers, ethylene/methyl methacrylate copolymers, and ionomer resins; aromatic-polyester-based resins such as polyethylene terephthalate, polybutylene terephthalate, and polyethylene naphthalate; aliphatic-polyester-based resins such as polylactic acid, polybutylene succinate, and polybutylene succinate-adipate; polyamide-based resins such as nylon-6, nylon-6,6, and m-xylylenediamine/adipic acid polycondensates; acrylic resins such as polymethacrylates and polymethyl methacrylate; styrene-based resins such as polystyrene and styrene/acrylonitrile copolymers; cellulosic resins such as cellulose triacetate and cellulose diacetate; halogen-containing resins such as polyvinyl chloride, polyvinylidene chloride, and polyvinylidene fluoride; and engineering plastics such as polycarbonate resins, polysulfone resins, polyethersulfone resins, polyetheretherketone resins, polyphenylene oxide resins, and liquid-crystal polymers.

It is also preferable that before application of the coating composition, such a plastic base is subjected to a plasma treatment, corona treatment, electron-beam treatment, or the like to thereby activate the base surface.

For applying the coating composition of the invention to the base described above, use can be made of known application methods including: gravure methods such as the direct gravure method and the reverse gravure method; roll coating methods such as the two-roll beat coating method and the bottom-feed three-roll method; the doctor-knife method; die coating; dip coating; bar coating; and spraying.

After the coating composition of the invention has been coated on (i.e., applied to) a base, a film thereof is formed by a heat treatment, thereby obtaining the coating film of the invention. The heat treatment should be suitably regulated in accordance with the thickness of the coating layer. The heat treatment temperature is usually 40 to 200° C., preferably 50 to 150° C., especially preferably 60 to 120° C.

The heat treatment period also should be suitably regulated in accordance with the heat treatment temperature described above, but is usually 0.1 to 200 hours, preferably 0.5 to 1 hour.

This heat treatment can be conducted in multiple stages. Especially in the case where a polyolefin-based resin having a low melting point (porous membrane, film, nonwoven fabric, or the like) is used as the base, it is preferred to use a wavelength-control drying system (manufactured by NGK Insulators Ltd., etc.) to conduct the drying usually under the conditions of 40 to 90° C. in order to diminish damage to the base.

In this coating film, the content of the fibrous metal oxide microparticles (B) corresponds to the content thereof in the coating composition. The fibrous metal oxide microparticles contained are mostly present in the PVA-based resin phase as a continuous phase. Because of this, a high level of heat resistance is obtained although the metal oxide microparticles have been incorporated in a small amount.

The content of the fibrous metal oxide microparticles in the continuous phase of the coating film, based on the total weight of the fibrous metal oxide microparticles present in the coating film, is usually 95 to 100% by weight, preferably 99 to 100% by weight.

The content of the fibrous metal oxide microparticles in the dispersoid of the coating film, based on the total weight of the fibrous metal oxide microparticles present in the coating film, is usually 0 to 5% by weight, preferably 0 to 1% by weight.

The contents of the fibrous metal oxide microparticles in the continuous phase and in the dispersoid can be determined, for example, by subjecting the coating film to an examination by a viscoelastometer to obtain a graph and calculating the contents from the shift values of the peaks (tan δ) for the respective resinous phases, or determined from an electron photomicrograph of the coating film.

The thickness of the coating film to be obtained from the coating composition of the invention thus obtained can be suitably regulated in accordance with the intended use thereof. The thickness thereof is usually 5 to 100 μm, especially 5 to 50 μm, in particular 10 to 30 μm. In case where the thickness thereof is too small, the coating film tends to have reduced strength. Meanwhile, in case where the thickness thereof is too large, the coating film tends to have reduced transparency.

The coating film obtained is used usually as a multilayer structure including the base. Namely, by applying the coating composition of the invention to a base and forming a film thereof by a heat treatment, a multilayer structure including a coating film (coating film layer) obtained from the coating composition of the invention can be obtained. This multilayer structure may include a synthetic resin such as a thermoplastic resin or a thermosetting resin, a glass, a metallic material such as an aluminum foil, or a layer of a natural material such as paper or wood, besides the coating film layer constituted of the coating film.

EXAMPLES

The present invention will be explained below in more detail by reference to Examples, but the invention should not be construed as being limited to the following Examples unless the invention departs from the spirit thereof.

In the Examples, "parts" is by weight unless otherwise indicated.

Test Example 1: Evaluation of Coating Compositions for Shrink Property

Evaluation Methods (1) Evaluation of Shrink Property

A coating film of a coating composition was formed on a base, and the coating film was peeled from the base. This film was cut into a size of 4 cm (length)×4 cm (width) to obtain a sample. This sample film was held at 150° C. for 3 hours.

The dimensions of the longer and shorter sides and the thickness of the heat-treated film were measured, and the degree of volume shrinkage (%) was calculated using the following equation.

The lower the degree of shrinkage, the smaller the shrinkage change through the heat treatment and the more the film is satisfactory.

Degree of volume shrinkage={1−((dimension of the length after heat treatment [cm])/4 [cm])×((dimension of the width after heat treatment [cm])/4 [cm])×((thickness after heat treatment [cm])/(thickness before heat treatment [cm]))}×100

(2) Evaluation of Coloring

The heat-treated film obtained in (1) above was examined for transmitted-light YI value with color difference meter SZ-Σ90 (manufactured by Nippon Denshoku Kogyo K.K.). The smaller the value thereof, the less the film has been colored and the more the film is satisfactory.

(3) Evaluation of Viscoelasticity (Measuring Frequency, 10 Hz; Heating Rate, 3.5° C./Min; Measuring Temperature Range, −50° C. To 230° C.)

A film obtained from the coating composition was examined with viscoelastometer DVA-225 (manufactured by IT Keisoku Seigyo K.K.) to determine the peak value, i.e., tan δ, for the PVA-based resin phase.

Example 1

Production of Emulsion (A) to be Contained in Coating Composition

Water was used as the dispersion medium of the emulsion, and a polyvinyl alcohol resin having the 1,2-diol structural unit represented by the chemical formula (1a) as side chains (degree of saponification, 98.5% by mole; average degree of polymerization, 300; content of side-chain 1,2-diol structural units, 8% by mole) was used as a dispersing agent. Furthermore, a monomer mixture composed of butyl acrylate/methyl methacrylate=55/45 (weight ratio) was used as acrylic monomers which gave an acrylic resin serving as a dispersoid.

An aqueous solution was produced by dissolving 46.2 parts of a polyvinyl alcohol resin having the 1,2-diol structural unit represented by the chemical formula (1a) as side chains (degree of saponification, 98.5% by mole; average degree of polymerization, 300; content of side-chain 1,2-diol structural units, 8% by mole) in 715 parts of water. Meanwhile, 700 parts of a monomer mixture composed of butyl acrylate/methyl methacrylate=55/45 (weight ratio) was prepared.

The aqueous solution was introduced into a stainless-steel reaction vessel equipped with a stirrer and a reflux condenser, and the temperature in the reaction vessel was kept at 80° C.

Thereinto was introduced 70 parts of the monomer mixture [butyl acrylate/methyl methacrylate=55/45 (weight ratio)] as monomers for first-stage emulsion polymerization. Furthermore, 5.7 parts of an aqueous ammonium persulfate solution (concentration, 10% by weight) was introduced as a polymerization initiator to initiate a first-stage polymerization reaction. The polymerization was conducted for 1 hour at a reaction temperature of 80° C.

Subsequently, 630 parts of the monomer mixture was used as monomers for second-stage emulsion polymerization, and 11.3 parts of the same aqueous ammonium persulfate solution was used as a polymerization initiator. The polymerization was continued while dropping these ingredients into the reaction vessel for 4 hours.

After completion of the second-stage emulsion polymerization (i.e., after completion of the dropping), 1.9 parts of the same aqueous ammonium persulfate solution was introduced, and additional polymerization was continued at the same temperature of 80° C. for 1 hour.

Thereafter, the reaction mixture was cooled to room temperature to obtain an emulsion (A). The content of resinous solid components in this emulsion was measured by the drying loss method through 105° C. 3-hour drying, and was found to be 50.7% by weight.

Into this emulsion (A) was incorporated 356 parts by weight of an aqueous polyvinyl alcohol solution (concentration, 20% by weight) (degree of saponification of the polyvinyl alcohol, 89% by mole; average degree of polymerization thereof, 500). Thus, an emulsion composition including the emulsion (A) was obtained.

The content of resinous solid components in this emulsion composition was determined by the drying loss method through 105° C. 3-hour drying, and was found to be 44.4% by weight. The emulsion composition had a viscosity as measured at 23° C. (Brookfield rotational viscometer HAVD-I Prime; using spindle rotor No. 1; rotational speed, 10 rpm) of 850 mPa·s.

<Production of Coating Composition>

The emulsion composition was used. As fibrous metal oxide microparticles, use was made of a sol of fibrous aluminum oxide microparticles having an average major-axis length of 1,400 nm, an average minor-axis length of 4 nm, and an average aspect ratio of 350 (alumina sol F-1000, manufactured by Kawaken Fine Chemicals Co., Ltd.; content of fibrous aluminum oxide microparticles, 4.7% by weight).

A hundred parts by weight of the emulsion composition was mixed with 7.14 parts by weight of the sol of fibrous aluminum oxide microparticles (corresponding to 0.34 parts by weight of the aluminum oxide), and this mixture was stirred with a kneader (Rentaro ARE-250, manufactured by Thinky Corp.) at 2,000 rpm for 10 minutes and then at 2,200 rpm for 0.5 minutes. Thus, a coating composition of the invention was obtained.

This coating composition has a total content of solid components of 41.8% by weight. In this coating composition, the content of the PVA-based resin on a solid basis in the coating composition is 5.8% by weight. In this coating composition, the amount of the fibrous metal oxide microparticles incorporated per 100 parts by weight of the resinous solid components of the coating composition is 0.8 parts by weight.

The coating composition obtained was cast on a polytetrafluoroethylene (hereinafter sometimes referred to as PTFE) sheet of 8×15 cm using a 100-nm applicator. This specimen was held at 23° C. for 48 hours and then held at 105° C. for 3 hours, thereby producing a film of 8×15 cm. This film was stripped from the PTFE sheet with a spatula and dried for 1 week in a desiccator containing diphosphorus pentoxide.

The film obtained was subjected to evaluations (1) to (3). The results of evaluations (1) and (2) are shown in Table 1. The results of evaluation (3) are also shown in Table 1.

Example 2

A coating composition and a film were produced in the same manners as in Example 1, except that the incorporation amount of the sol of fibrous aluminum oxide microparticles was changed to 15.08 parts by weight (corresponding to 0.71 parts by weight of the aluminum oxide), and the film was subjected to the same evaluations.

This coating composition has a total content of solid components of 39.2% by weight. In this coating composition, the content of the PVA-based resin on a solid basis in the coating composition is 5.4% by weight. In this coating composition, the amount of the fibrous metal oxide microparticles incorporated per 100 parts by weight of the resinous solid components of the coating composition is 1.6 parts by weight.

Example 3

A coating composition and a film were produced in the same manners as in Example 1, except that the incorporation amount of the sol of fibrous aluminum oxide microparticles was changed to 33.98 parts by weight (corresponding to 1.60 parts by weight of the aluminum oxide), and the film was subjected to the same evaluations.

This coating composition has a total content of solid components of 34.3% by weight. In this coating composition, the content of the PVA-based resin on a solid basis in the coating composition is 4.7% by weight. In this coating composition, the amount of the fibrous metal oxide microparticles incorporated per 100 parts by weight of the resinous solid components of the coating composition is 3.6 parts by weight.

Comparative Example 1

A coating composition and a film were produced in the same manners as in Example 1, except that as fibrous metal oxide microparticles, use was made of a sol of fibrous aluminum oxide microparticles having an average major-axis length of 3,000 nm, minor-axis length of 4 to 6 nm, and aspect ratio of 500 to 750 (alumina sol F-3000, manufactured by Kawaken Fine Chemicals Co., Ltd.; 4.9% by weight), and that this sol of fibrous aluminum oxide microparticles was incorporated in an amount of 14.5 parts by weight (corresponding to 0.71 parts by weight of the aluminum oxide) per 100 parts by weight of the emulsion composition. This film was subjected to the same evaluations.

This coating composition has a total content of solid components of 39.4% by weight. In this coating composition, the content of the PVA-based resin on a solid basis is 5.5% by weight. In this coating composition, the amount of the fibrous metal oxide microparticles incorporated per 100 parts by weight of the resinous solid components of the coating composition is 1.6 parts by weight.

Comparative Example 2

A coating composition and a film were produced in the same manners as in Example 1, except that in place of fibrous metal oxide microparticles, use was made of a powder of spherical (aspect ratio=1) aluminum oxide microparticles having an average particle diameter of 13 nm (AEROXIDE Alu C, manufactured by Nippon Aerosil Co., Ltd.), and that this powder of aluminum oxide microparticles was used in an amount of 0.71 parts by weight per 100 parts by weight of the emulsion composition. This film was subjected to the same evaluations.

This coating composition has a total content of solid components of 44.8% by weight. In this coating composition, the content of the PVA-based resin on a solid basis is 6.2% by weight. In this coating composition, the amount of the fibrous metal oxide microparticles incorporated per 100 parts by weight of the resinous solid components of the coating composition is 1.6 parts by weight.

The results are shown in Table 1.

Example 4

Production of Emulsion (A) to be Contained in Coating Composition

An emulsion was prepared under the same conditions as in Example 1.

<Production of Coating Composition>

The emulsion composition was used. As fibrous metal oxide microparticles, use was made of a sol of fibrous aluminum oxide microparticles having an average major-axis length of 1,400 nm, an average minor-axis length of 4

TABLE 1

| | Coating composition | | | | | | |
|---|---|---|---|---|---|---|---|
| | Average major-axis length of fibrous metal oxide microparticles (B) (nm) | Average aspect ratio of fibrous metal oxide microparticles (B) | Total content of solid components in coating composition (wt %) | Content of PVA-based resin on solid basis in coating composition (wt %) | Fibrous metal oxide microparticles (B) (per 100 parts by weight of resinous solid components of coating composition) (parts by weight) | Degree of volume shrinkage (%) | YI value | Evaluation of viscoelasticity (tanδ peak temperature for PVA-based resin phase) (° C.) |
| Example 1 | 1400 | 350 | 41.8 | 5.8 | 0.8 | 5.0 | 6.0 | 93.7 |
| Example 2 | 1400 | 350 | 39.2 | 5.4 | 1.6 | 4.6 | 5.0 | 94 |
| Example 3 | 1400 | 350 | 34.3 | 4.7 | 3.6 | 1.9 | 5.8 | 95.8 |
| Comparative Example 1 | 3000 | 500 to 750 | 39.4 | 5.5 | 1.6 | 10.9 | 8.5 | 90.5 |
| Comparative Example 2 | 13 (diameter) | 1 | 44.8 | 6.2 | 1.6 | 3.9 | 35.4 | 88.6 |

As can be seen from the results given in Table 1, Comparative Example 1, in which fibrous metal oxide microparticles having an average major-axis length of 3,000 nm and an average aspect ratio of 500 to 750 had been used, showed a high degree of volume shrinkage and a high YI value. Furthermore, Comparative Example 2, in which spherical metal oxide microparticles having an aspect ratio of 1 had been used, showed an exceedingly high YI value. Shrinkage and coloring were not both inhibited in each of Comparative Examples 1 and 2. In contrast, in the case of using the coating compositions of the invention, which each contained fibrous metal oxide microparticles having a specific aspect ratio, it is apparent that the effect of attaining a high level of heat resistance is obtained in which both shrinkage and coloring are inhibited.

Test Example 2: Evaluation of Coating Compositions for Heat Resistance

<Evaluation Method>

(4) Evaluation by Thermomechanical Analysis

A test piece obtained using a coating composition was evaluated for thermal deformation during heating using an apparatus for thermomechanical analysis (TMAQ800, manufactured by TA Instruments). The measurement was made in the compression mode at a load of 5 gf/mm², under the conditions of a temperature range of 25 to 250° C. and a heating rate of 10° C./min.

Heat resistance was evaluated in terms of the degree of deformation (%) at 200° C. and the degree of deformation (%) at 250° C. The lower the degree of deformation, the higher the heat resistance.

nm, and an average aspect ratio of 350 (alumina sol F-1000, manufactured by Kawaken Fine Chemicals Co., Ltd.; content of fibrous aluminum oxide microparticles, 4.7% by weight).

A hundred parts by weight of the emulsion composition was mixed with 14.2 parts by weight of the sol of fibrous aluminum oxide microparticles (corresponding to 0.67 parts by weight of the aluminum oxide), and this mixture was stirred with a kneader (Rentaro ARE-250, manufactured by Thinky Corp.) at 2,000 rpm for 10 minutes and then at 2,200 rpm for 0.5 minutes. Thus, a coating composition of the invention was obtained.

This coating composition has a total content of solid components of 39.5% by weight. In this coating composition, the content of the PVA-based resin on a solid basis in the coating composition is 5.5% by weight. In this coating composition, the amount of the fibrous metal oxide microparticles incorporated per 100 parts by weight of the resinous solid components of the coating composition is 1.5 parts by weight.

A given amount of the coating composition obtained was placed in an aluminum cup and dried for 3 hours by heating at 80° C. Furthermore, the dried composition was vacuum-dried at 60° C. for 2 days and then vacuum-dried at room temperature for 2 days in the presence of diphosphorus pentoxide. Thus, a test piece having a film thickness of about 500 μm was obtained.

The test piece obtained was subjected to the evaluation (4) described above. The results thereof are shown in Table 2.

Example 5

Production of Emulsion (A) to be Contained in Coating Composition

Water was used as the dispersion medium of the emulsion, and a polyvinyl alcohol resin having the 1,2-diol structural unit represented by the chemical formula (1a) as side chains (degree of saponification, 98.5% by mole; average degree of polymerization, 1,200; content of side-chain 1,2-diol structural units, 6% by mole) was used as a dispersing agent. Furthermore, a monomer mixture composed of styrene/butyl acrylate=45/55 (weight ratio) was used as acrylic monomers which gave an acrylic resin serving as a dispersoid.

An aqueous solution was produced by dissolving 225 parts of a polyvinyl alcohol resin having the 1,2-diol structural unit represented by the chemical formula (1a) as side chains (degree of saponification, 98.5% by mole; average degree of polymerization, 1,200; content of side-chain 1,2-diol structural units, 6% by mole) in 715 parts of water. Meanwhile, 176 parts of a monomer mixture composed of styrene/butyl acrylate=45/55 (weight ratio) was prepared.

The aqueous solution was introduced into a stainless-steel reaction vessel equipped with a stirrer and a reflux condenser, and the temperature in the reaction vessel was kept at 80° C.

Thereinto was introduced 17.6 parts of the monomer mixture [styrene/butyl acrylate=45/55 (weight ratio)] as monomers for first-stage emulsion polymerization. Furthermore, 5.62 parts of an aqueous ammonium persulfate solution (concentration, 10% by weight) was introduced as a polymerization initiator to initiate a first-stage polymerization reaction. The polymerization was conducted for 1 hour at a reaction temperature of 80° C.

Subsequently, 158.4 parts of the monomer mixture was used as monomers for second-stage emulsion polymerization, and 11.3 parts of the same aqueous ammonium persulfate solution was used as a polymerization initiator. The polymerization was continued while dropping these ingredients into the reaction vessel for 4 hours.

After completion of the second-stage emulsion polymerization (i.e., after completion of the dropping), 1.87 parts of the same aqueous ammonium persulfate solution was introduced, and additional polymerization was continued at the same temperature of 80° C. for 1 hour.

Thereafter, the reaction mixture was cooled to room temperature to obtain an emulsion (A). The content of resinous solid components in this emulsion was measured by the drying loss method through 105° C. 3-hour drying, and was found to be 30.2% by weight. The emulsion had a viscosity as measured at 23° C. (Brookfield rotational viscometer HAVD-I Prime; using spindle rotor No. 6; rotational speed, 10 rpm) of 24,000 mPa·s.

Using the emulsion, a coating and a test piece were prepared in the same manners as in Example 4, except that the incorporation amount of the fibrous metal oxide microparticles was changed to 6.4 parts by weight (corresponding to 0.30 parts by weight of the aluminum oxide). The test piece was subjected to the evaluation by thermomechanical analysis.

This coating composition has a total content of solid components of 28.7% by weight. In this coating composition, the content of the PVA-based resin on a solid basis in the coating composition is 15.4% by weight. In this coating composition, the amount of the fibrous metal oxide microparticles incorporated per 100 parts by weight of the resinous solid components of the coating composition is 1.0 part by weight.

Comparative Example 3

A coating composition and a test piece were produced in the same manners as in Example 4, except that as fibrous metal oxide microparticles, use was made of a sol of fibrous aluminum oxide microparticles having an average major-axis length of 3,000 nm, minor-axis length of 4 to 6 nm, and aspect ratio of 500 to 750 (alumina sol F-3000, manufactured by Kawaken Fine Chemicals Co., Ltd.; 4.9% by weight), and that this sol of fibrous aluminum oxide microparticles was incorporated in an amount of 13.6 parts by weight (corresponding to 0.67 parts by weight of the aluminum oxide) per 100 parts by weight of the emulsion composition. This test piece was subjected to the same evaluation.

This coating composition has a total content of solid components of 39.7% by weight. In this coating composition, the content of the PVA-based resin on a solid basis in the coating composition is 5.5% by weight. In this coating composition, the amount of the fibrous metal oxide microparticles incorporated per 100 parts by weight of the resinous solid components of the coating composition is 1.5 parts by weight.

Comparative Example 4

A coating composition and a film were produced in the same manners as in Example 4, except that in place of fibrous metal oxide microparticles, use was made of a powder of spherical (aspect ratio=1) aluminum oxide microparticles having an average particle diameter of 13 nm (AEROXIDE Alu C, manufactured by Nippon Aerosil Co., Ltd.), and that this powder of aluminum oxide microparticles was used in an amount of 0.67 parts by weight per 100 parts by weight of the emulsion composition in Example 4. This film was subjected to the same evaluation.

This coating composition has a total content of solid components of 44.8% by weight. In this coating composition, the content of the PVA-based resin on a solid basis in the coating composition is 6.2% by weight. In this coating composition, the amount of the fibrous metal oxide microparticles incorporated per 100 parts by weight of the resinous solid components of the coating composition is 1.5 parts by weight.

Comparative Example 5

A coating composition and a test piece were prepared under the same conditions as in Example 4, except that the fibrous metal oxide microparticles were not added to the emulsion prepared in Example 4. The test piece was subjected to the evaluation by thermomechanical analysis.

Comparative Example 6

A coating composition and a test piece were prepared under the same conditions as in Example 5, except that the fibrous metal oxide microparticles were not added to the emulsion prepared in Example 5. The test piece was subjected to the evaluation by thermomechanical analysis.

The results are shown in Table 2.

TABLE 2

| | Average major-axis length of fibrous metal oxide microparticles (B) (nm) | Average aspect ratio of fibrous metal oxide microparticles (B) | Coating composition | | | Degree of deformation at 200° C. (%) | Degree of deformation at 250° C. (%) |
| --- | --- | --- | --- | --- | --- | --- | --- |
| | | | Total content of solid components in coating composition (wt %) | Content of PVA-based resin on solid basis in coating composition (wt %) | Fibrous metal oxide microparticles (B) (per 100 parts by weight of resinous solid components of coating composition) (parts by weight) | | |
| Example 4 | 1400 | 350 | 39.5 | 5.5 | 1.5 | 5.5 | 5.5 |
| Example 5 | 1400 | 350 | 28.7 | 15.4 | 1.0 | 3.0 | 3.5 |
| Comparative Example 3 | 3000 | 500 to 750 | 39.7 | 5.5 | 1.5 | 16.8 | 18.3 |
| Comparative Example 4 | 13 (diameter) | 1 | 44.8 | 6.2 | 1.5 | 11.2 | 16.3 |
| Comparative Example 5 | — | — | 44.4 | 6.3 | — | 12.0 | 18.3 |
| Comparative Example 6 | — | — | 30.2 | 16.4 | — | 6.0 | 10.0 |

As apparent from Example 4 and Example 5 shown in Table 2, the degree of deformation at 200° C. and the degree of deformation at 250° C. were reduced by using the fibrous metal oxide microparticles having an average major-axis length of 1,400 nm and an average aspect ratio of 350. It was thus ascertained that the coating compositions of the invention, which contain fibrous metal oxide microparticles having a specific aspect ratio, bring about improved resistance to thermal shrinkage even at temperatures as high as 200° C. and 250° C.

While the invention has been described in detail and with reference to specific embodiments thereof, it will be apparent to one skilled in the art that various changes and modifications can be made therein without departing from the spirit and scope thereof. This application is based on a Japanese patent application filed on May 28, 2013 (Application No. 2013-111851) and a Japanese patent application filed on Dec. 6, 2013 (Application No. 2013-253253), the contents thereof being incorporated herein by reference.

INDUSTRIAL APPLICABILITY

The coating composition of the invention and the coating film obtained therefrom have a high level of heat resistance and are hence useful because the coating composition can be used to form coating films for protecting members which, during use, are exposed to direct sunlight and heat up to high temperatures, such as automotive instrument panels, the external walls of buildings, and display panels disposed outdoors, or for protecting members which are exposed to environments where heat generation or the like occurs, such as separators for various secondary ion batteries, thereby forming multilayer structures.

The invention claimed is:

1. A coating composition comprising (A) an emulsion which comprises a polyvinyl alcohol-based resin as a dispersing agent, an acrylic resin as a dispersoid, and water as a dispersion medium and (B) fibrous metal oxide microparticles, wherein the fibrous metal oxide microparticles have an average major-axis length of 10 to 2,500 nm and an average aspect ratio of 200 to 450.

2. The coating composition according to claim 1, wherein the amount of the fibrous metal oxide microparticles (B) incorporated into the coating composition is 0.1 to 10 parts by weight per 100 parts by weight of the resinous solid components of the coating composition.

3. The coating composition according to claim 1, wherein the fibrous metal oxide microparticles (B) are fibrous microparticles of an oxide of a metal selected from the Group 13 to 15 elements of the periodic table.

4. The coating composition according to claim 1, wherein the polyvinyl alcohol-based resin of the emulsion (A) is a polyvinyl alcohol-based resin which has a structural unit represented by the following chemical formula (1)

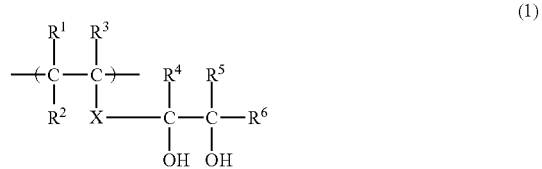

in which $R^1$, $R^2$, and $R^3$ each independently represents a hydrogen atom or an organic group, X represents a single bond or a bonding chain, and $R^4$, $R^5$, and $R^6$ each independently represents a hydrogen atom or an organic group.

5. The coating composition according to claim 1, which includes a second polyvinyl alcohol-based resin.

6. A coating film obtained from the coating composition according to claim 1.

7. A multilayer structure comprising a coating film layer constituted of the coating film according to claim 6 on a base.

8. A process for producing a multilayer structure, the process comprising applying the coating composition according to claim 1 to a base and forming a film to obtain the multilayer structure.

* * * * *